L. W. Boynton.
Flocking Mach.
N° 13380.  Patented Aug. 7. 1855.

UNITED STATES PATENT OFFICE.

L. W. BOYNTON, OF WORCESTER, MASSACHUSETTS.

MACHINE FOR PREPARING FLOCK.

Specification of Letters Patent No. 13,380, dated August 7, 1855.

*To all whom it may concern:*

Be it known that I, LEANDER W. BOYNTON, of the city and county of Worcester, in the State of Massachusetts, have invented a new and useful Improvement in Machinery for Preparing Flock; and I do hereby declare that the following is a full, clear, and exact description of the construction, character, and operation of the same, reference being had to the accompanying drawings, which make a part of this specification, in which—

Figure 1:
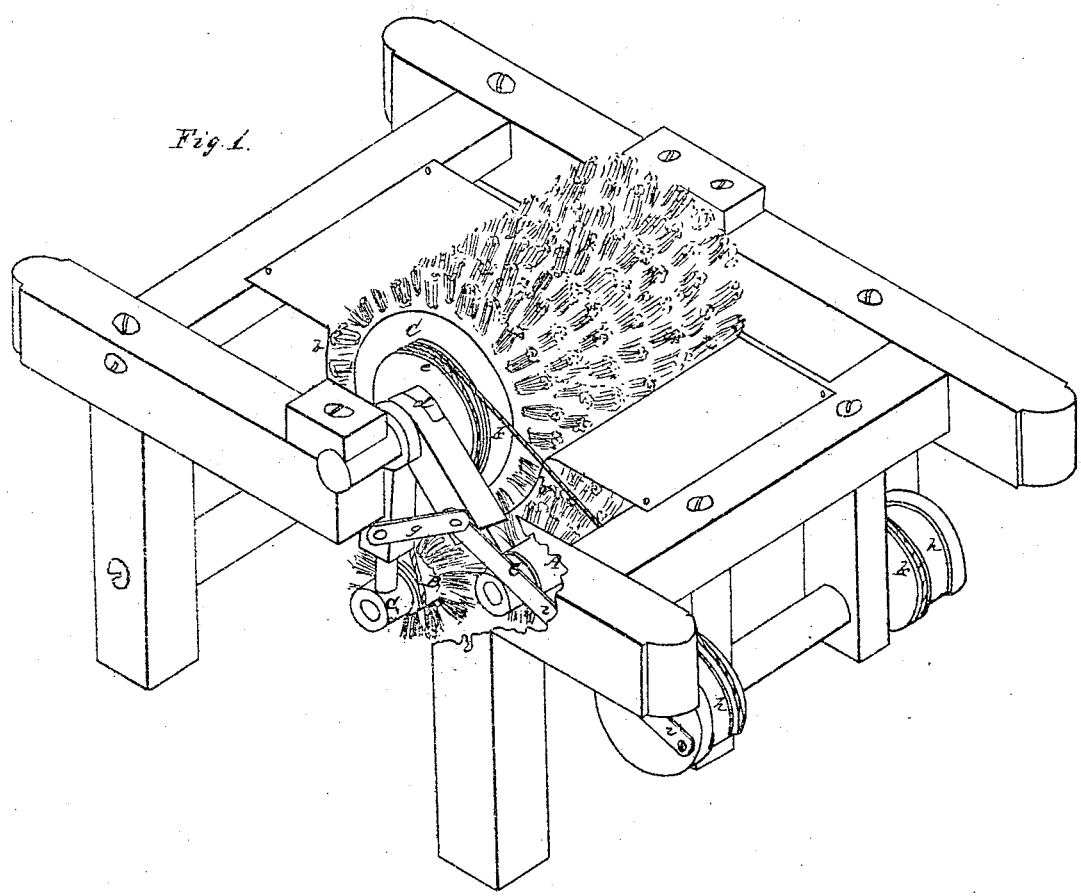
Figure 2:
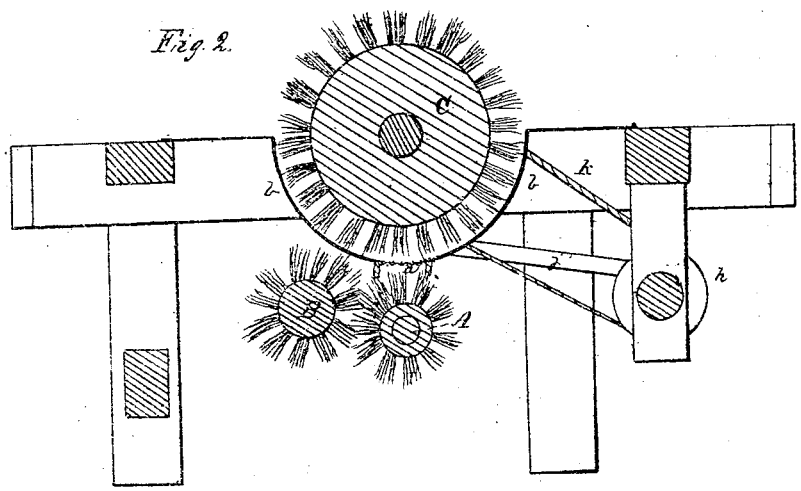

Figure 1 is a perspective view of so much of the machine as shows the present improvement. Fig. 2 is a section of the same cut vertically at right angles to the brushes.

My improvement on my previously patented machinery for preparing flock, consists in fitting two, (or any other convenient number of) brushes under the screen, and giving to them, both a rotary and a transverse-reciprocating motion, to brush off all the particles of flock which would, otherwise, by the effect of electricity, or other attraction adhere to the under side of the screen, to prevent clogging, and so that the flock will be distributed over the web with entire uniformity, while the machine is made to operate, in other respects, essentially as specified in my patent issued July 18, 1854.

I make the frame, endless apron, brushes, screen, &c., substantially in the manner described in my patent for preparing flock, issued July 18, 1854, fitting the screen in the bottom, as seen at *a*, Fig. 2, (and sustaining it by the sides, *b*, and *b*, Figs. 1 and 2, or otherwise.)

In addition to the above, I use two (or any other convenient number of) cylindrical brushes, located beneath the screen, *a*, as represented at A and B, Figs. 1 and 2. I support these brushes, A and B, at each end, in movable bearings, as represented at *c* and *c*, Fig. 1. The upper ends of the arms which support these bearings work freely on the shaft of the brush, C, as represented at *d*, Fig. 1, (or any other suitable support,) so as to allow them to have a lateral vibratory motion, which motion is given by connecting rods *g* and *i*, Fig. 1, (used at both ends,) as indicated by *j*, Fig. 2. These connecting rods are worked by crank pins on the faces of the pulleys *h*, and *h*, as seen in Fig. 1. And these pulleys, *h*, and *h*, are revolved by bands *k*, and *k*, Figs. 1, and 2, or, otherwise. And I give a rotary motion to the brushes A, and B, by bands, one of which is seen at B, and *e*, Fig. 1, or they may be revolved by any other convenient means, as the circumstances may suggest.

Having constructed and arranged the several parts, as before described, I feed the flock in the usual way, by an endless apron, or otherwise, and put the machine in operation. And when the brush, C, works the flock against the screen, *a*, Fig. 2, the brushes A, and B, by their revolutions will brush out the flock from the under side of the screen, and allow it to fall on the web. And the brushes, A, and B, will also receive a lateral reciprocating motion, so as to sweep across the under side of the screen, as A, when the connecting rods are in the position indicated in Fig. 2, and B, when in the position shown in Fig. 1, thus alternately cleaning the screen by both a rotary, and a lateral reciprocating motion; and also cleaning each other by the ends of their brussels coming in contact, as represented in the drawings.

What I claim as my invention, and desire to secure by Letters Patent, is—

The combination of the screen, *a*, with the brush, or brushes, (as A, and B,) when the brush, or brushes, have both a rotary, and a reciprocating motion, and the whole is constructed, combined, and made to operate, substantially as herein described.

L. W. BOYNTON.

Witnesses:
BENAH W. HYDE,
JAS. G. ARNOLD.